United States Patent [19]

Higuchi et al.

[11] 4,115,676

[45] Sep. 19, 1978

[54] INDUCTION HEATING APPARATUS

[75] Inventors: Iwao Higuchi, Ayase; Takashi Fujita, Kawasaki, both of Japan

[73] Assignee: Tokyo Shibaura Electric Co., Ltd., Tokyo, Japan

[21] Appl. No.: 767,116

[22] Filed: Feb. 9, 1977

[30] Foreign Application Priority Data

| Feb. 10, 1976 | [JP] | Japan | 51-13541 |
| Feb. 10, 1976 | [JP] | Japan | 51-13542 |
| Feb. 10, 1976 | [JP] | Japan | 51-13543 |
| Feb. 10, 1976 | [JP] | Japan | 51-13544 |
| Feb. 10, 1976 | [JP] | Japan | 51-13545 |
| Jul. 27, 1976 | [JP] | Japan | 51-89470 |

[51] Int. Cl.² ............................................. H05B 5/04
[52] U.S. Cl. ...................... 219/10.49 R; 219/10.77; 323/4; 363/80; 363/97
[58] Field of Search ........................ 219/10.49, 10.77; 363/80, 96, 97; 323/4

[56] References Cited

U.S. PATENT DOCUMENTS

| 3,129,366 | 4/1964 | Fry | 219/10.77 UX |
| 3,925,633 | 12/1975 | Partridge | 219/10.77 |
| 3,930,193 | 12/1975 | Kornrumpf et al. | 219/10.77 |
| 4,010,342 | 3/1977 | Austin | 219/10.77 |
| 4,016,391 | 4/1977 | Kiuchi et al. | 219/10.77 |
| 4,016,392 | 4/1977 | Kobayashi et al. | 219/10.77 |

*Primary Examiner*—Bruce A. Reynolds
*Attorney, Agent, or Firm*—Finnegan, Henderson, Farabow, Garrett

[57] ABSTRACT

An induction heating apparatus comprises a DC power source, a series resonant circuit of a heating coil and capacitance connected between the terminals of the DC power source, a diode connected in parallel with the capacitor and in polarity-reversed relation to the DC power source, a transistor having a collector-emitter path connected in parallel with the capacitor, and a control circuit for controlling the conductive state of the transistor in accordance with the magnitude and direction of a current flowing through the heating coil.

17 Claims, 42 Drawing Figures

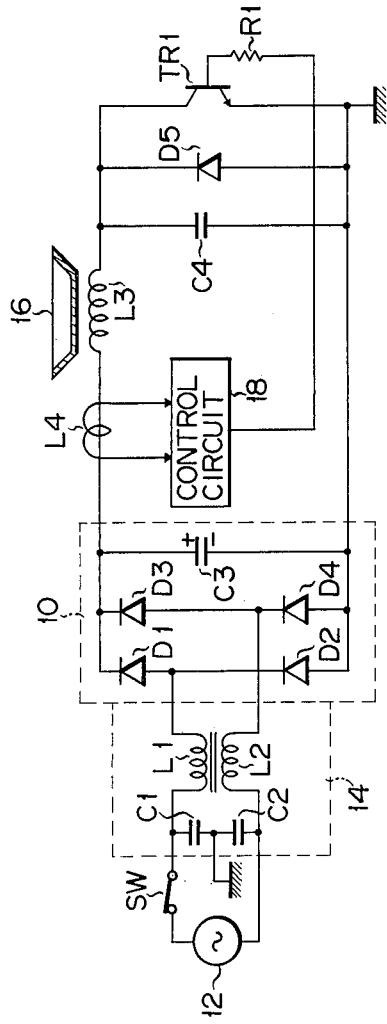
F I G. 1
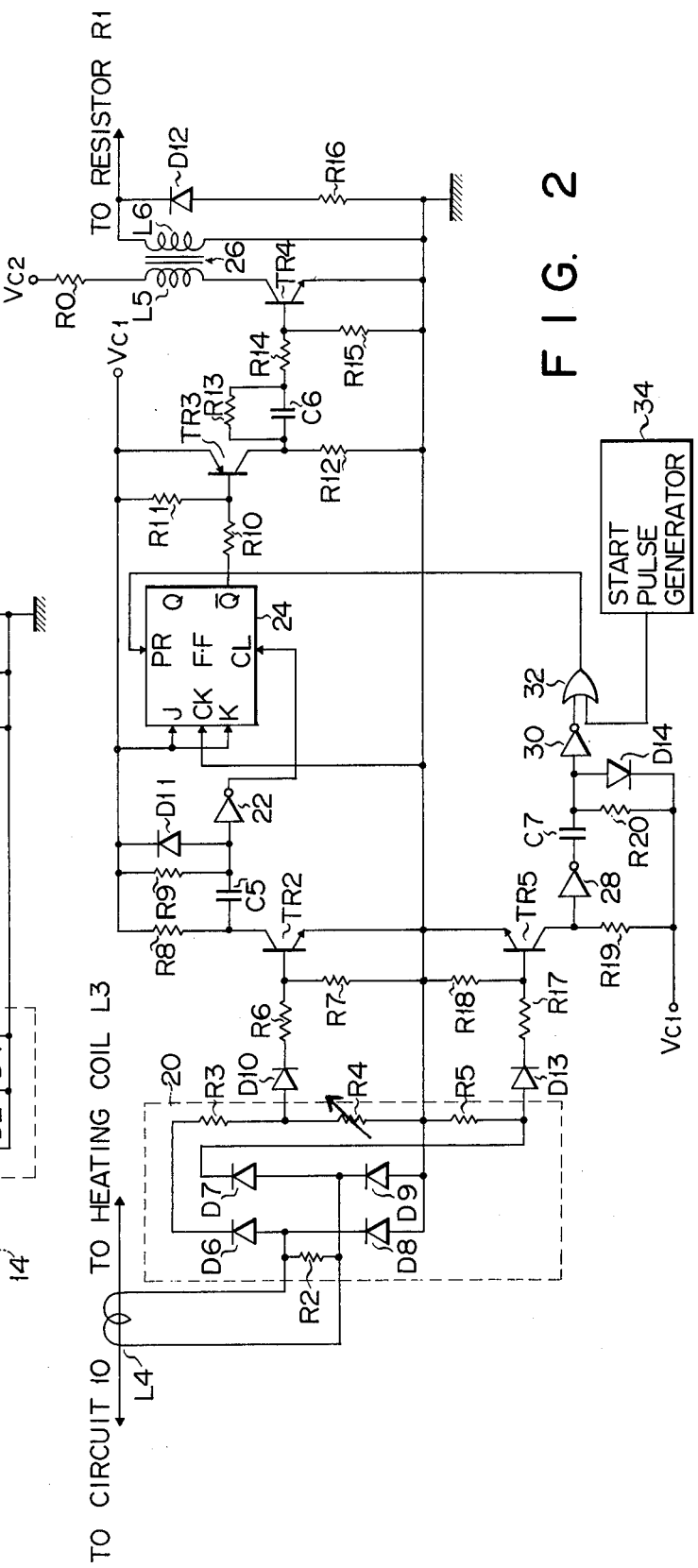
F I G. 2

INDUCTION HEATING APPARATUS

BACKGROUND OF THE INVENTION

This invention relates to an induction heating apparatus.

Two types of induction heating apparatus are known. One type is of a series inverter control system in which a heating coil is connected in series with a capacitor and the other type is of a parallel inverter control system in which a heating coil is connected in parallel with a capacitor. In either system a sinnsoidal current of high frequency is continuously or intermittently supplied to the heating coil to heat a load, such as a pan, which is located near the heating coil. Where an electric power control is effected by the above-mentioned inverter control system, the load power is controlled by phase-controlling or rectification-controlling a power source voltage using, for example, a thyristor.

Since in such conventional induction heating apparatus the dissipation power of the load is varied in proportion to substantially a square of a power source voltage, the dissipation power tends to be easily varied with respect to the variation of a power source and it is necessary to use a highly stable power source. In the conventional induction heating apparatus an electromagnetic energy stored in the heating coil is not fed back to the power source, resulting in poor electric power efficiency. In the no load state a surge voltage more than several times as large as a voltage occurring in the load state is developed and there is a chance that a thyristor for control will be destroyed by the surge voltage. Since the load electric power is controlled by an AC phase control or rectification control the apparent electric power is increased, lowering the electric power efficiency. Furthermore, a critical rate ($di/dt$) of rise of the ON-state current is increased and in consequence there is a tendency for radio frequency interference (RFI) to occur.

SUMMARY OF THE INVENTION

It is accordingly an object of this invention to provide an induction heating apparatus substantially free from the above-mentioned drawbacks.

According to one aspect of this invention there is an induction heating apparatus comprising first and second DC power source terminals, a series circuit connected between the first and second DC power source terminals and including a heating coil and a capacitor, a rectifying element connected in parallel with the capacitor and in polarity-reversed relation to the DC power source terminals, a switching means connected in parallel with the capacitor, current detection means for detecting a current through the heating coil, and control means for controlling the conductive state of the switching element in accordance with the magnitude and direction of a current detected by the current detecting means, whereby a current whose direction is alternately changed and whose magnitude is controlled can flow through the heating coil.

BRIEF DESCRIPTION OF THE DRAWING

FIG. 1 is a circuit diagram showing an induction heating apparatus according to one embodiment of this invention;

FIG. 2 is a circuit diagram showing a detail of a control circuit in the induction heating apparatus in FIG. 1;

FIGS. 7A to 7B are signal waveform diagrams for explaining the operation of the control circuit in FIG. 6;

DETAILED DESCRIPTION OF THE PREFERRED EMBODIMENTS

Figure 3:
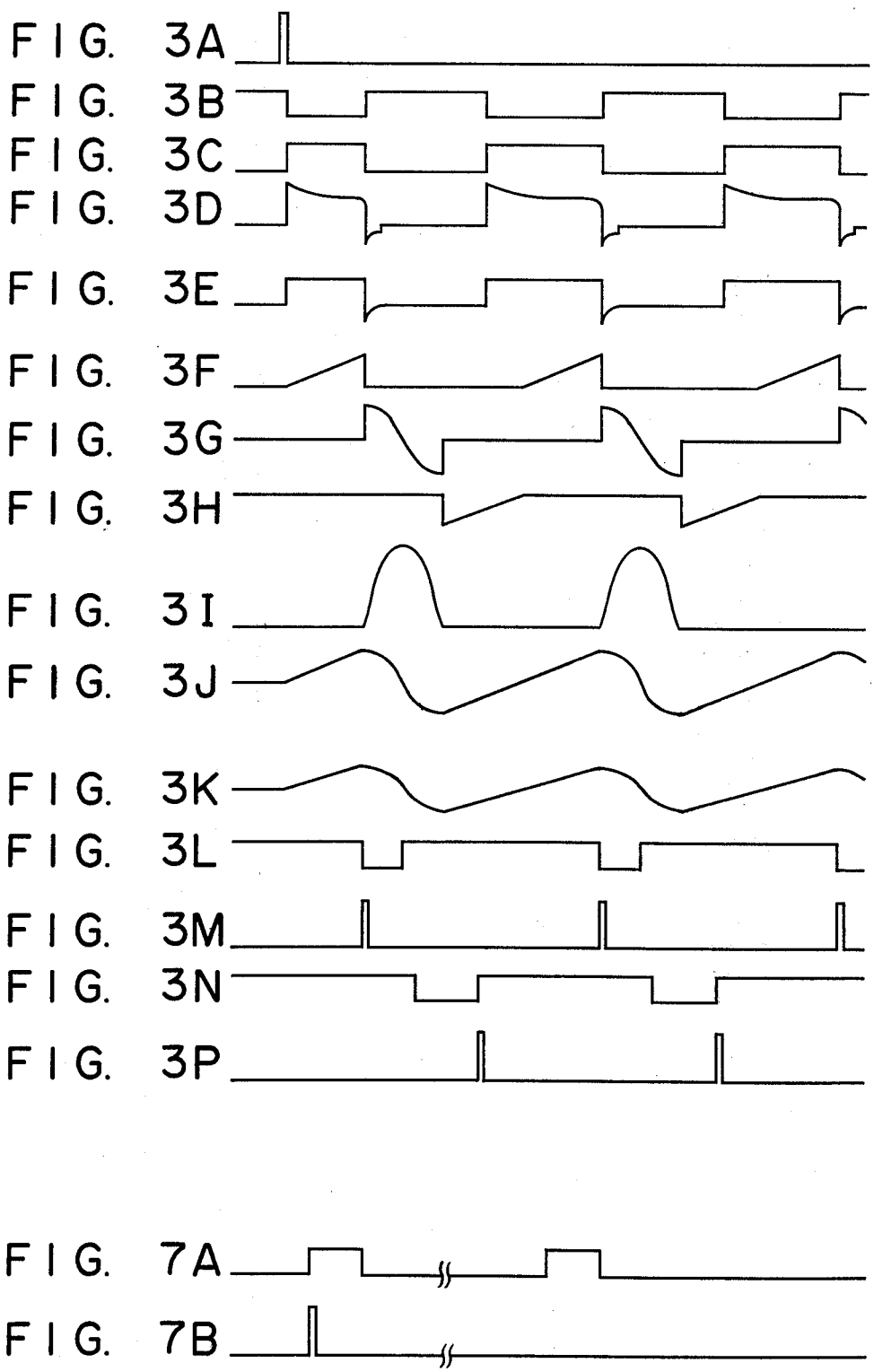
FIGS. 3A to 3P are signal waveform diagrams for explaining the operation of a heating circuit in FIGS. 1 and 2.

FIG. 1 shows a circuit diagram of an induction heating apparatus according to one embodiment of this invention. A rectifying circuit 10 rectifies an AC voltage which is supplied upon closure of a power source SW, from a power source 12 through a radio frequency interference prevention circuit comprised of capacitors C1 and C2 and mutually electromagnetically coupled coils L1 and L2. The rectifying circuit 10 comprises a capacitor C3, a series circuit of diodes D1 and D2 connected in parallel with the capacitor C3, and a series circuit of diodes D3 and D4 connected in parallel with the capacitor C3, and receives an AC voltage at a junction between the diodes D1 and D2 and a junction between the diodes D3 and D4 to generate a DC voltage across the capacitor C3. The negative terminal of the capacitor C3 is grounded.

Across the capacitor C3 in the rectifying circuit 10 is connected a series circuit of a capacitor C4 and a heating coil L3 for heating a load 16 such as a cooking pan etc. A diode D5 is connected in parallel with the capacitor C4 with its polarity reversed in relation to the DC voltage from the rectifying circuit 10. Connected in parallel with the capacitor C4 is a collector-emitter path of a transistor TR1 which acts as a switching element. The base of the transistor TR1 is connected through a resistor R1 to a control circuit 18 for generating a control signal in response to an output current of a current detection coil L4 for detecting a current flowing through the heating coil L3.

FIG. 2 shows one example of the control circuit 18.

An output current of the current detection coil L4 is fed to a current detection circuit 20 in the control circuit 18. The current detection circuit 20 comprises a resistor R2 connected across the current detection coil L4, a diode D6 whose anode is connected to one end of the resistor R2, resistors R3 and R4 serially connected between the cathode of the diode D6 and ground, a diode 7 whose anode is connected to the other end of the resistor R2, a resistor R5 connected between the cathode of the diode D7 and ground, and diodes D8 and D9 the cathodes of which are connected to the diodes D6 and D7, respectively, and the anodes of which are connected to ground.

A first output terminal of the current detection circuit 20, i.e., a junction between the resistors R3 and R4 is connected through a diode D10 and resistor R6 to the base of a transistor TR2. The base of the transistor TR2 is grounded through a resistor R7 and when a voltage is generated across the resistor R2 to permit a current to flow through the diode D6, resistors R3 and R4 and diode D9, the conduction state of the transistor TR2 is controlled by a voltage across the resistor R4 and a voltage drop across a series circuit of the diode D10 and resistor R6.

The emitter of the transistor TR2 is grounded and the collector of the transistor TR2 is connected through a resistor R8 to a power source $V_{C1}$ and through a capacitor C5 to an inverter 22. A resistor R9 connected between the input terminal of the inverter 22 and the power source $V_{C1}$ constitutes, together with the capacitor C5, a differentiating circuit. A diode D11 connected in parallel with the resistor R9 protects the inverter 22 from a surge voltage which is generated from the above-mentioned differentiating circuit.

The output terminal of the inverter 22 is connected to a clear terminal CL in a J-k flip-flop circuit 24. The input terminals J and K of the flip-flop circuit 24 are connected to the power source $V_{C1}$ and a clock terminal CK is grounded. The output terminals $\overline{Q}$ of the J-K flip-flop circuit is connected through a resistor R10 to the base of the transistor TR3. The base of the transistor TR3 is connected through a resistor R11 to the power source $V_{C1}$, the emitter of the transistor TR3 is connected to the power source $V_{C1}$ and the collector of the transistor TR3 is connected to the base of the transistor TR4 through a parallel circuit of a capacitor C6 and resitor R13 and a resistor R14. The base of the transistor TR4 is grounded through a resistor R15, the emitter of the transistor TR4 is grounded, and the collector of the transistor TR4 is connected through a primary coil L5 in a pulse transformer 26 and a resistor R0 to a power source $V_{C2}$. One end of a secondary coil L6 in the pulse transformer 26 is grounded and the other end of the secondary coil L6 is connected through the resistor R1 to the base of the transistor TR1 as shown in the induction heating circuit in FIG. 1. A series circuit of a diode D12 and resistor R16 is connected in parallel with the secondary coil 26 of the pulse transformer 26. This series circuit prevents the destruction of the transistor TR1 by a surge voltage across the secondary coil L6 of the pulse transformer and provides a positive switching operation to the transistor TR1.

A second output terminal of the current detection circuit 20, i.e., an ungrounded terminal of a resistor R5, is connected through a diode D13 and resistor 17 to the base of the transistor TR5. The base of the transistor TR5 is grounded through a resistor R18, the emitter of the transistor TR5 is grounded, and the collector of the transistor TR5 is connected through a resistor R19 to the power source $V_{C1}$. When a voltage is developed across the resistor R2 to permit a current to flow through the diode D7, resistor R5 and diode D8, the conduction state of the transistor TR5 is controlled by a voltage across the resistor R5 and a voltage drop across a series circuit of the diode D13 and resistor R17.

The collector of the transistor TR5 is connected through an inverter 28 and capacitor C7 to an inverter 30. A resistor R20 is coupled between the input terminal of the inverter 30 and the power source $V_{C1}$ and constitutes, together with the capacitor C7, a differentiating circuit. A diode D14 connected in parallel with the resistor R20 serves to protect the inverter 30 like the diode 11. The output terminal of the inverter 30 is connected through an OR gate 32 to a preset terminal PR of the J-K flip-flop circuit 24. A start pulse generator 34 is connected to the OR gate 32 and adapted to gang with a power source switch SW in the induction heating circuit to generate a start pulse a predetermined time after the switch SW is closed.

The operation of the induction heating circuit as shown in FIGS. 1 and 2 will be explained by referring to FIGS. 3A to 3P.

First of all, the power source switch SW is closed. At this time, the transistor TR1 is maintained in a nonconductive state and a pulse as shown in FIG. 3A is generated from the start pulse generator 34 in FIG. 2 a predetermined time after the power source switch SW is closed. The pulse of the start pulse generator 34 is applied through the OR gate 32 to the preset terminal PR of the J-K flip-flop circuit 24 to cause the latter to be set. The flip-flop circuit 24 supplies a low level output signal as shown in FIG. 3B from its output terminal $\overline{Q}$ to the base of the transistor TR3 to cause the latter to be rendered conductive. As a result, the collector output signal of the transistor TR3 becomes a high level signal as shown in FIG. 3C. The collector output signal of the transistor TR3 is fed through the parallel circuit of capacitor C6 and resistor R13 and resistor R14 and converted to a signal as shown in FIG. 3D which is in turn applied to the base of the transistor TR4 to cause the transistor TR4 to be rendered conductive. As a result, a current transiently flows through the primary coil L5 in the pulse transformer 26 and a voltage as shown in FIG. 3E is generated across the secondary coil L6 of the pulse transformer 26. This voltage is applied through the resistor R1 to the base of the transistor TR1 to cause the transistor TR1 to be rendered conductive.

When the transistor TR1 is so rendered conductive, a current starts flowing from the rectifying circuit 10 through the coil L3 and transistor TR1. This current substantially linearly increases, as shown in FIG. 3F, with a rising rate of E/L3 where E indicates an output voltage of the rectifying circuit 10. A current flowing through the heating coil L3 is detected at the detection coil L4 and a voltage, as shown in FIG. 3K, corresponding to the current through the heating coil L3 is generated across the resistor R2. When the current through the heating coil L3 reaches a predetermined value, i.e., a voltage across the resistor R2 reaches a predetermined value, a voltage on a junction between the resistors R3 and R4 is applied through the diode D10 and resistor R6 to the base of the transistor TR2 to cause the latter to be rendered conductive. When the transistor TR2 is so rendered conductive, the collector voltage of the transistor TR2 is shifted to a low level as shown in FIG. 3L and a pulse as shown in FIG. 3M emerges from the inverter 22. The output pulse of the inverter 22 is supplied to the clear terminal CL of the flip-flop circuit 24 to cause the latter to be cleared, permitting the transistors TR3 and TR4 to be nonconductive and consequently the transistor TR1 to be rendered nonconductive. Then, the capacitor C4 is charged by an electromagnetic energy stored in the heating coil L3. That is, a current flows from the heating coil L3 to the capacitor C4. When the electromagnetic energy of the heating coil L3 is dissipated a charging energy in the capacitor C4 is subsequently discharged through the heating coil L3. That is, a current flows in the direction of the heating coil L3 from the capacitor C4 and thus a resonance current flows through the heating coil L3 as shown in FIG. 3G. In this case, a voltage across the capacitor C4, i.e., the collector voltage of the transistor TR1 varies as shown in FIG. 3I. Thereafter, a current flows from the heating coil L3 through the capacitor C3 and diode D5 as shown in FIG. 34. As a result, a current flows into the heating coil L3 as shown in FIG. 3J which shows a composite waveform of FIGS. 3F, 3G and 3H.

When the absolute value of a voltage across the resistor R2 is increased to a predetermined value according to a current which flows in the direction of the capacitor C3 from the heating coil L3, this voltage is applied through the diode D13 and the resistor R17 to the base of the transistor TR5 to cause the latter to be turned ON. The turn ON state of the transistor TR5 is held until the absolute value of the voltage across the resistor R2 is decreased to the above-mentioned predetermined level and, as shown in FIG. 3N, the collector voltage of the transistor TR5 is held at a zero level during this time period. The collector voltage of the transistor TR5, after being inverted at the inverter 28, is differentiated at the differentiating circuit constituted by the capacitor C7 and resistor R20. As shown in FIG. 3P a pulse is generated from the inverter 30 at a time corresponding to a time at which the absolute value of the voltage across the resistor R2 is decreased to the above-mentioned predetermined value. This pulse is applied through the OR gate 32 to the preset terminal PR of the flip-flop circuit 24 to set the flip-flop circuit 24. In this way, the transistor TR1 is again rendered conductive and a current flows through the heating coil L3 and transistor TR1. At this time, no voltage is applied to the collector of the transistor TR1 and the transistor TR1 can be rendered conductive when a voltage of about 0V is applied to its base. Thereafter, substantially the same operation is repeatedly performed. When the transistor TR1 is in the nonconductive state a maximum value $V_p$ of the collector voltage (FIG. 3I) is given by the following equation.

$$V_p = \{ \frac{\pi}{9} ( \frac{T}{Th} - 1) + 1 \} E \qquad (1)$$

where $T$ denotes a cycle of a current (FIG. 3J) through the heating coil L3 and $Th$ denotes a period during which a resonance current flows through the capacitor C4.

$$Th = \pi \sqrt{L3 \cdot C4} \qquad (2)$$

Since the above-mentioned induction heating coil is so controlled that a current through the heating coil L3 or the collector voltage $V_p$ of the transistor TR1 takes on a predetermined maximum value, the frequency of a current through the heating coil L3 is determined by the heating coil L3 and capacitor C4 as will be understood from the equations (1) and (2). Suppose, for example, that in order for Th/T to have a value of 0.45 to 0.55 use is made of a capacitor having a sufficiently great capacitance as the capacitor C4 and the control circuit 18 is so designed as to make the maximum value of the collector voltage $V_p$ of the transistor TR1 below 2.3 to 3.3 times the output voltage of the rectifying circuit 10. Then, it is possible to use as the transistor TR1 a transistor having a low breakdown voltage rating. By so doing, the cost of the transistor TR1 can be lowered and the saturation voltage of the transistor TR1 can be restricted to a low level with the attendant low dissipation. Generally, the inductance of the heating coil L3 varies dependent upon the size, shape and material of an article to be heated. Since according to this invention, however, the cycle of the current through the heating coil L3 is controlled in accordance with the variation of inductance of the heating coil L3 a current flows smoothly and continuously through the heating coil L3.

Since in the above-mentioned embodiment a current through the heating coil L3 is so controlled as to be made constant, an effect exerted by the variation of the power source voltage on a load electric power is restricted as compared with a conventional induction heating apparatus.

Figures 4, 5, 8:
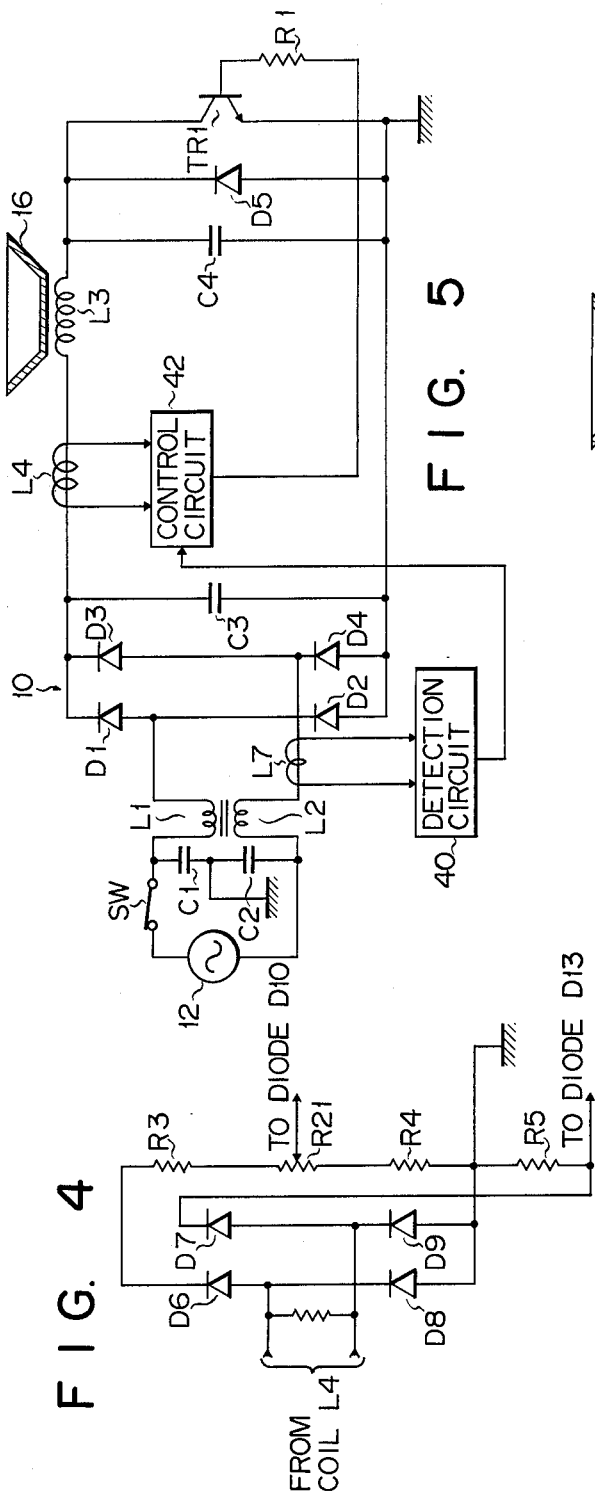
FIG. 4 shows a modification of a voltage detection circuit in the control circuit in FIG. 2.
FIG. 5 is a circuit diagram showing an induction heating apparatus, according to another embodiment of this invention, which includes a no load state detection circuit.
FIG. 8 is a circuit diagram showing an induction heating apparatus, according to another embodiment of this invention, which includes a no load state detection circuit.

FIG. 4 shows a modified form of the current detection circuit 20 in the control circuit shown in FIG. 2. Between the resistors R3 and R4 in the current detection circuit shown in FIG. 4 is connected a slide resistor R21 having a slider connected to the diode 10. The maximum value of a current FIG. 3J) through the heating coil L3 is controlled by moving the slider on the slide resistor R20.

Figure 6:
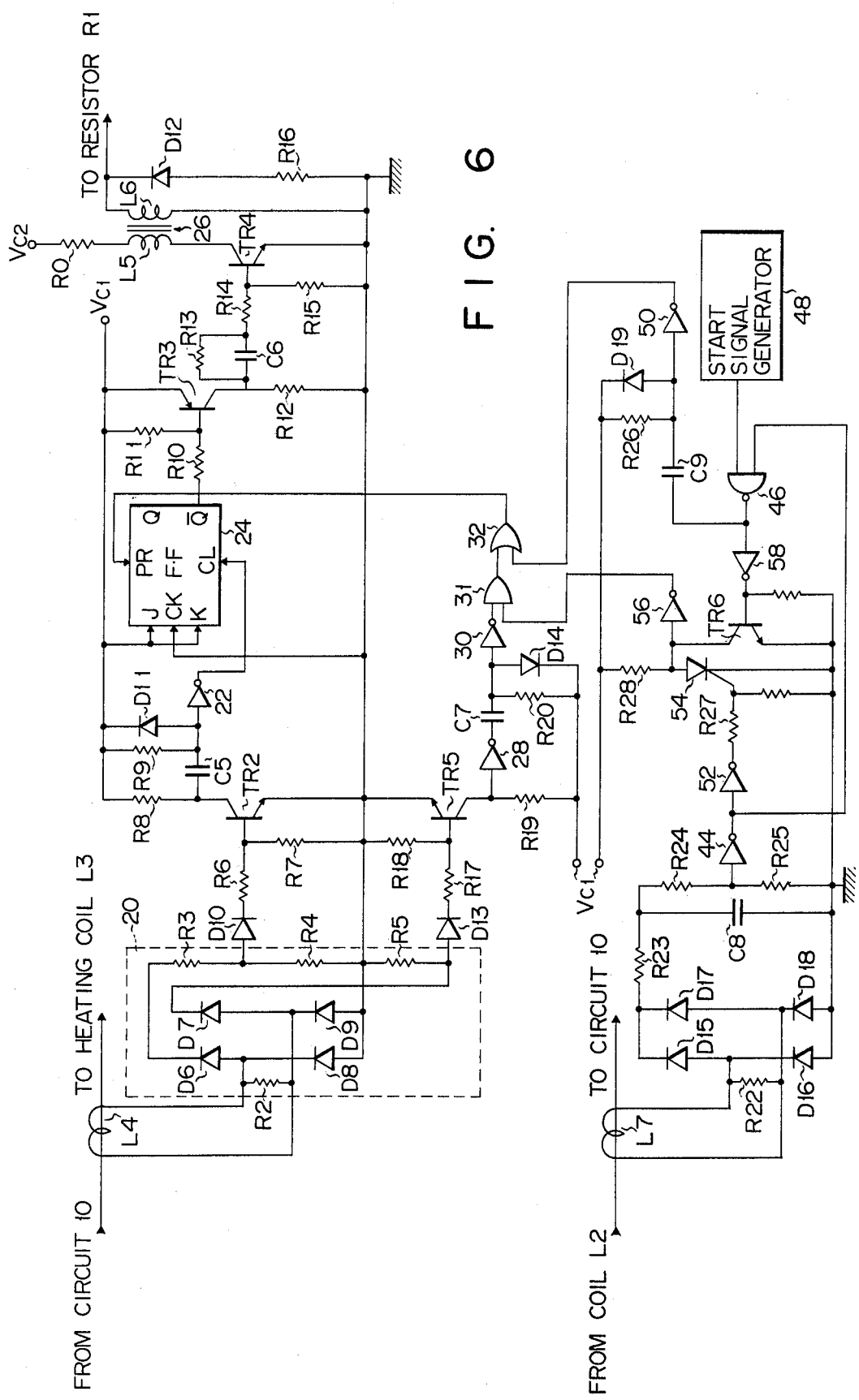
FIG. 6 is a detailed explanatory view showing the no load detection circuit and control circuit in a heating circuit in FIG. 5.

FIGS. 5 and 6 each show an induction heating apparatus according to another embodiment of this invention. In each embodiment the same reference numerals are employed to designate parts or elements corresponding to those shown in FIGS. 1 and 2.

In FIG. 5 a "no load" state detection circuit 40 responds to that current detected at a current detection coil 7 which flows from a power source 12 through coils L1 and L2 into a rectifying circuit 10, and when this circuit reaches a predetermined peak value, i.e., either no article (to be heated) or only a small load such as a spoon etc. is placed on the heating coil L3, an inhibition signal is sent to a control circuit 42 to cause a transistor TR1 to be rendered nonconductive.

The operation of a "no load" state detection circuit 40 and control circuit 42 will be explained by referring to FIG. 6. A control circuit 42 in FIG. 6 is substantially the same as the control circuit 18 in FIG. 2, except that an AND gate 31 is connected between an inverter 30 and an OR gate 32.

Upon closure of the power source switch SW a current having a great peak value irrespective of a load current flows through the rectifying circuit 10 to cause a smoothing capacitor C3 to be charged. In consequence, a current detected by a current detection coil L7 is great but a charging voltage divided by resistors R24 and R25 shows a low level during the time period in which a capacitor C8 is charged through a resistor R22, a rectifying circuit constituted by diodes D15 to D18, and a resistor R23. Accordingly, a high level output signal is generated from an inverter 44 and the output signal of the inverter 44 is supplied to one input terminal of a NAND gate 46. To the other input terminal of the NAND gate 46 is connected a start signal generator 48 for cyclically generating a start signal having a great interval as shown in FIG. 7A. The output signal of the NAND gate 46 is differentiated by a differentiating circuit constituted by a capacitor C9 and resistor R26 and the differentiated signal is supplied, as a start pulse as shown in FIG. 7B, by OR gate 32 through an inverter 50 to a J-K flip-flop circuit 24 to set the latter. A diode D19 is connected in parallel with the resistor R26 in the differentiating circuit to protect the inverter 50.

If a load 16 is normally set during the start time the charging voltage of the capacitor C8 shows a high level and a high level voltage is applied to the inverter 44 to generate a low level output signal. The low level output signal of the inverter 44 is supplied to the NAND gate 46 to prohibit an output signal of the start signal generator 48 from being supplied to the OR gate 32. The low level output signal of the inverter 44 is also supplied through an inverter 52 and resistor R27 to the gate of a thyristor 54 to turn ON the latter. In consequence, a potential on a junction between a resistor R28 and the thyristor 54 becomes a low level and a high level signal is supplied from an inverter 56 to the AND gate 31 to open or enable the gate of the AND gate 31. In this way, the same heating operation as explained in FIGS. 1 and 2 is repeatedly effected.

When the load 16 is removed the output signal of the inverter 44 becomes a high level, causing application of the gate voltage to the thyristor 54 to be interrupted and permitting a signal of the signal generator 48 to be passed through the NAND gate 46. The signal from the signal generator 48 is inverted at an inverter 58 and then applied to the base of a transistor TR6 to cause the latter to be rendered conductive to permit the thyristor 54 to be turned OFF. When the output signal of the signal generator 48 again becomes a low level, the transistor TR6 is rendered nonconductive, closing or disabling the AND gate 31.

When at the start time no load 16 is set on a heating coil L3, the output signal of the inverter 44 becomes a high level and a low level voltage of the inverter 44 is applied to the gate of the thyristor 54, and the thyristor 54 is not turned ON. When the load 16 is set, a high level voltage is applied to the gate of the thyristor 54, causing the thyristor to be rendered conductive to start a heating operation. During the no load time period the AND gate 31 is opened or enabled only when a high level signal which is cyclically generated from the signal generator 48 is present and in consequence an induction heating operation is substantially stopped.

Figure 9:
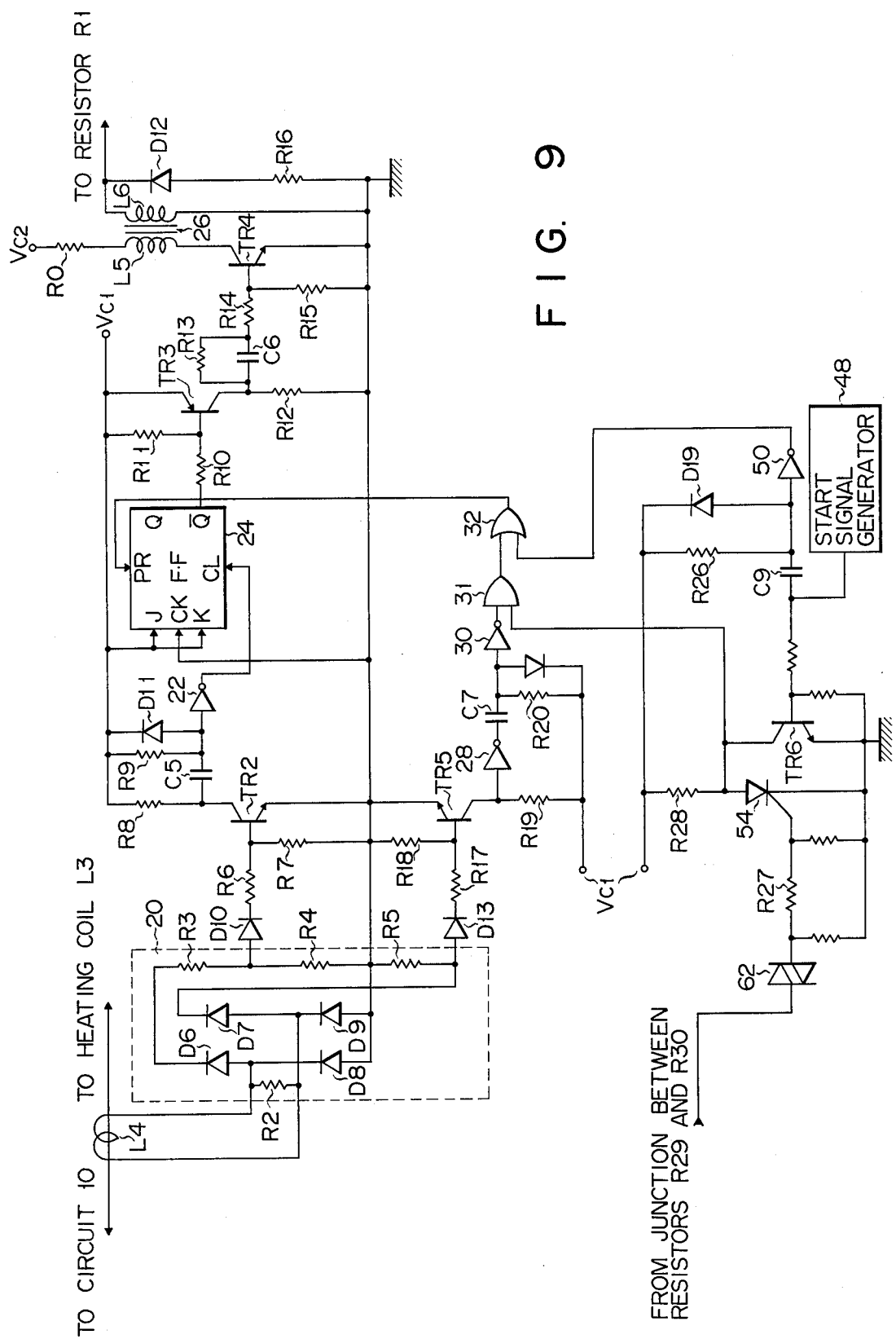
FIG. 9 is a detailed explanatory view showing the no load state detection circuit and control circuit in the induction heating circuit.

FIGS. 8 and 9 show an induction heating apparatus according to another embodiment of this invention. In order to detect a no load state use is made in this embodiment of a series circuit of resistors R29 and R30 connected in parallel with a capacitor C4, and a no load state detection circuit 60 for controlling a control circuit 42 in response to a voltage divided by the resistors R29 and R30. This embodiment is substantially similar to the embodiment as shown in FIGS. 5 and 6 except in these respects. The same reference numerals are employed to designate parts or elements corresponding to those shown in FIGS. 5 and 6 and further explanation of those parts or elements is therefore omitted.

If at the start time a load 16 is normally set on the heating coil L3, a voltage on a junction between the resistors R29 and R30 is at a sufficiently low level and a Diac 62 is not triggered. In consequence, a thyristor 54 is not turned ON, since the gate of the thyristor 54 is held at a ground potential. A high level signal is applied to an AND gate 31 to cause it to be enabled and the same heating operation as explained in connection with FIGS. 1 and 2 is repeatedly effected.

When in this state the load 16 is removed, the Diac 62 is triggered to cause a high level voltage to be applied to the gate of the thyristor 54 for conduction. In consequence the AND gate 31 is closed and the heating operation is stopped.

If at the start time no load is set on a heating coil L3, the Diac 62 is triggered, causing the thyristor 54 to be turned ON and permitting the AND gate 31 to be disabled. As a result, no heating operation is effected. When in this state the load is set on the heating coil L3, the Diac 62 is turned OFF and the gate of the thyristor 54 becomes a ground potential.

On the other hand, a transistor TR6 is rendered conductive by a high level output signal from a start signal generator 48, causing the thyristor 54 to be turned OFF. When the output signal of the start signal generator 48 becomes a low level the transistor TR6 is turned OFF, causing the thyristor 54 to be turned OFF. When the output signal of the signal generator 48 becomes a low level the transistor TR6 is turned OFF to cause the AND gate 31 to be enabled. In consequence the heating operation is started.

Figure 10:
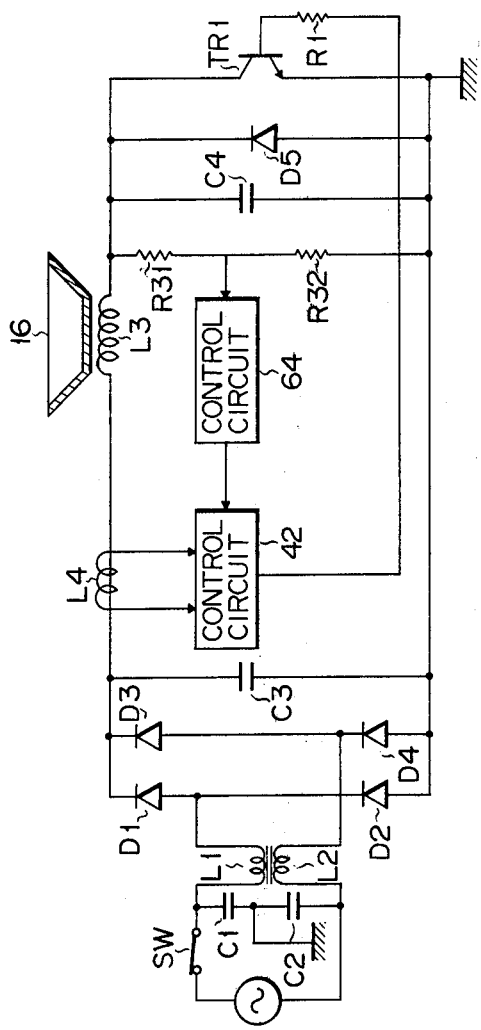
FIG. 10 is a circuit diagram showing an induction heating apparatus, according to another embodiment of this invention, which includes a time ratio control circuit for controlling an operation period.
Figure 11:
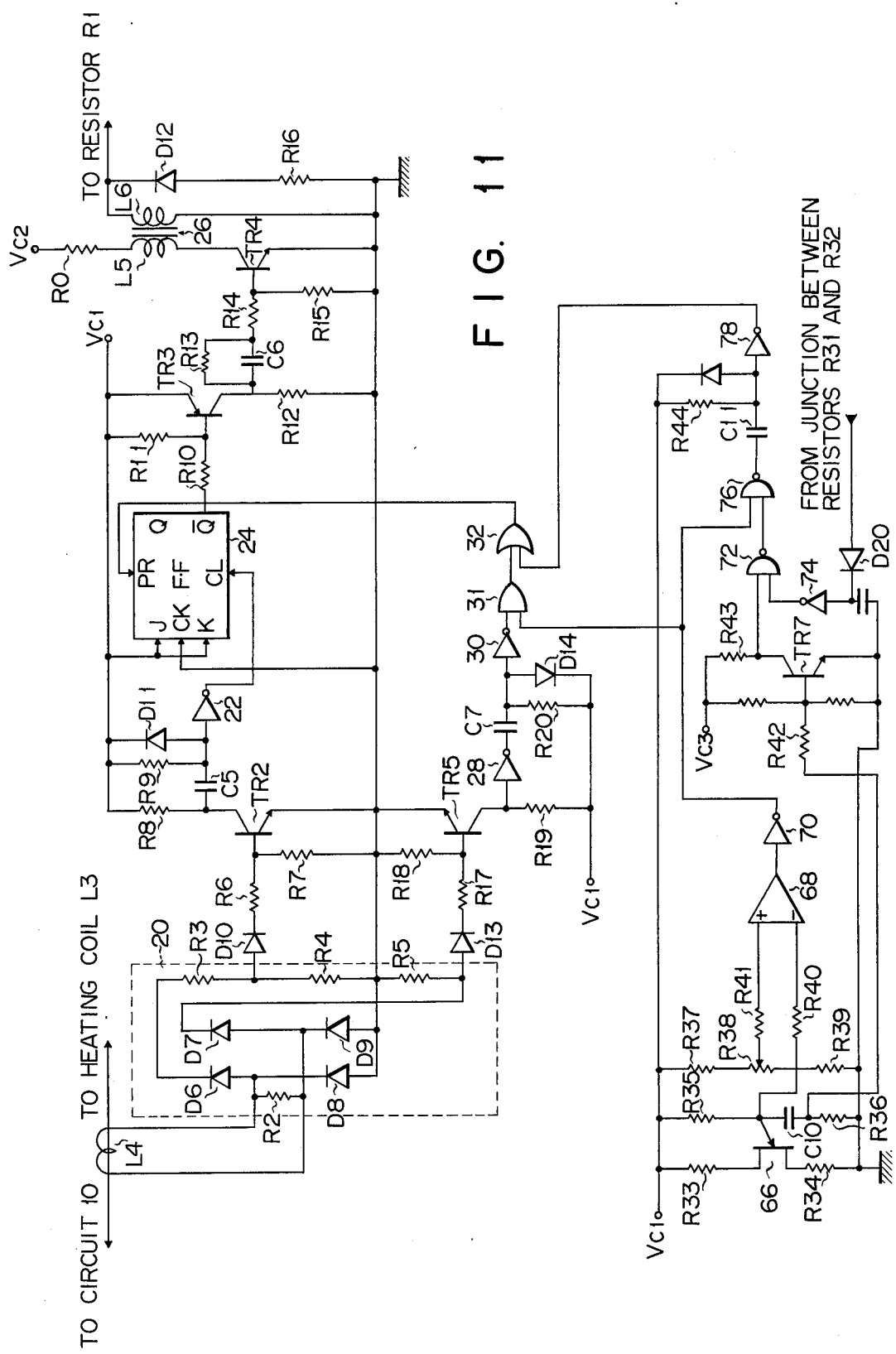
FIG. 11 is a detailed explanatory view showing the time ratio control circuit and operation control circuit in the induction heating apparatus in FIG. 10.

FIGS. 10 and 11 show an indication heating apparatus according to another embodiment of this invention. A control circuit 42 in FIG. 10 is substantially similar to the control circuit 18 in FIG. 1, except that there is provided an AND gate 31 coupled between an inverter 30 and an OR gate 32 as will be explained more in detail in FIG. 11. In this embodiment a series circuit of resistors R31 and R32 is connected in parallel with a capacitor C4, and a time ratio control circuit 64 for applying a control signal to the control circuit 42 is provided to control the state of the transistor TR1 in response to a voltage on a junction between the resistors R31 and R32.

IN FIG. 11, a series circuit of a resistor R33, unijunction transistor 66 and resistor R34 is connected between a power source $V_{C1}$ and ground. Between the power source $V_{C1}$ and ground are connected a series circuit of a resistor R35, capacitor C10 and resistor 36 and a series circuit of a resistor R37, slide resistor R38 and resistor R39. The emitter of the unijunction transistor 66 is connected to a junction between the capacitor C10 and the resistor R35 and then to one input terminal of an operational amplifier 68 through a resistor R40. A slider of the slide resistor R38 is connected through a resistor R41 to the other input terminal of the operational amplifier 68. The output of the operational amplifier 68 is coupled through an inverter 70 to the AND gate 31.

A junction between the capacitor C10 and the resistor R36 is coupled through a resistor R42 to the base of a transistor TR7. The collector of the transistor TR7 is connected through a resistor R43 to a power source $V_{C3}$ and the emitter of the transistor TR7 is grounded.

The collector voltage of the transistor TR7 is connected to one input terminal of a NAND gate 72. The NAND gate 72 receives at the other input terminal a signal which is supplied from a junction between the resistors R31 and R32 (FIG. 10) through a diode D20 and inverter 74. The output terminal of the NAND gate 72 is connected to one input terminal of a NAND gate 76, and the other input terminal of the NAND gate 76 is connected to the output of the inverter 70. An output signal of the NAND gate 76 is supplied to the OR gate 32 through a differentiating circuit, constituted by a capacitor C11 and resistor R44, and an inverter 78.

Figure 12A:
FIGS. 12A to 12D are signal waveform diagrams for explaining the operation of a time ratio control circuit in FIG. 11.
Figure 12B:
Figure 12C:
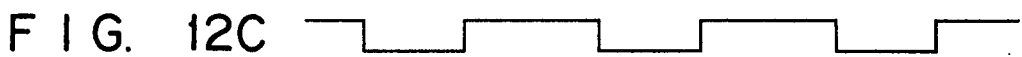
Figure 12D:

The resistors R33 to R36, unijunction transistor 66 and capacitor C10 constitute an oscillation circuit operating at an oscillation frequency as determined by the resistor R35 and R36. A signal is indicated in a solid line in FIG. 12A is generated from the emitter of the unijunction transistor. The operational amplifier 68 is adapted to compare the emitter voltage of the unijunction transistor 76 with a reference voltage (a broken line in FIG. 12A) determined by the resistors R37, R38 and R39, to generate a signal as shown in FIG. 12B. The output signal of the operational amplifier 68 is, after inverted as shown in FIG. 12C at the inverter 70, applied to the AND gate 31. WHen, on the other hand, the emitter voltage of the unijunction transistor 66 is decreased to below a predetermined value as shown in FIG. 12A, the transistor TR7 is turned OFF and a pulse signal as shown in FIG. 12D is generated from the collector of the transistor TR7.

With a load set on the heating coil L3 a potential on the junction between the resistors R31 and R32 shows a high level a predetermined time after the power source switch SW is closed. In consequence, a high level signal is generated from the NAND gate 72. This signal is applied to the NAND gate 76 to cause the latter to be enabled to permit an output signal of the inverter 70 to be inverted and passed through the NAND gate 76. The output signal of the inverter 70 is differentiated by the differential circuit comprised of the capacitor C11 and resistor R44, each time it is changed from a high level to a low level. The differentiated signal is, after being inverted at the inverter 78, supplied through the OR gate 32 to the J-K flip-flop circuit 24 to set the same.

By adjusting the reference voltage by R38 it is possible to change a ratio of To/T substantially from 0 to 1, where To denotes the high level period of the output signal of the inverter 70 and T the cycle of the output signal of the oscillation circuit including the unijunction transistor 66.

When the starting operation is effected with the ratio of To/T set to 1 from the start, no start signal is obtained from the inverter 70 since the output of the inverter 70 is at a high level. In the initial state a voltage on a junction between resistors R31 and R32 shows a low level and the NAND gate 72 is opened by the output signal of the inverter 74. In consequence a pulse signal from the collector of the transistor TR7 is passed through the NAND gate 72 and the NAND gate 76 which is opened by the output signal of the inverter 0, and applied as a start signal to the flip-flop circuit 24.

In this way, the operative state of the control circuit 42 is controlled by adjusting the position of the slider with respect to the slide resistor 38 to vary the level of the reference voltage and in consequence a load electric power to the heating coil L3 can be varied substantially in a range of 0 to 100%.

Figure 13:
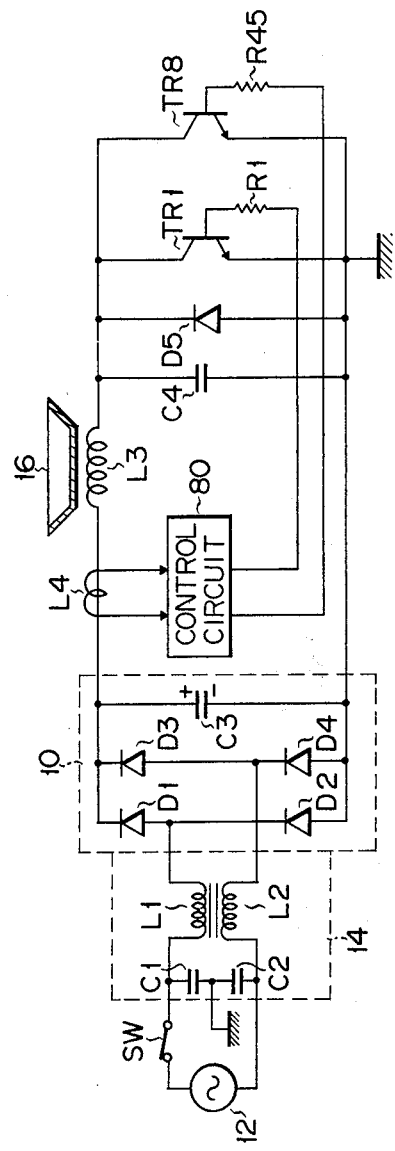
FIG. 13 is a circuit diagram showing an induction heating apparatus according to another embodiment of this invention.
Figure 14:
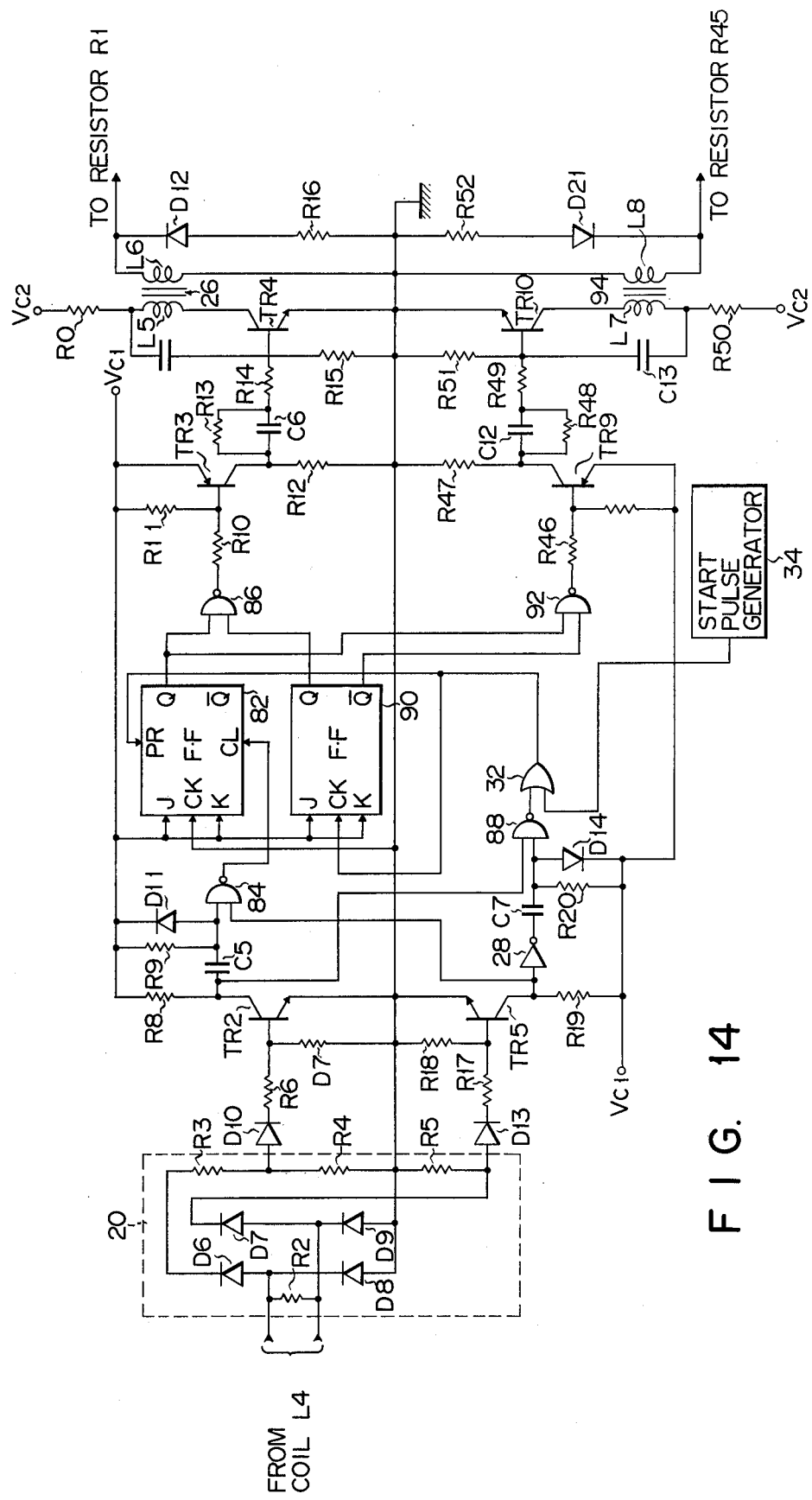
FIG. 14 is a detailed explanatory view showing an operation control circuit in the induction heating coil in FIG. 13.

FIGS. 13 and 14 show an induction heating apparatus according to another embodiment of this invention. In this embodiment, a transistor TR8 is further provided. The collector-emitter path of the transistor TR8 is connected in parallel with the collector-emitter path of a transistor TR1. The induction heating apparatus in FIG. 13 is substantially similar to that in FIG. 1, except that a control circuit 80 is so designed as to control the conductive states of the transistors TR1 and TR8 respectively through resistors R1 and R45. In this embodiment the same reference numerals are employed to designate elements or sections corresponding to those shown in FIGS. 1 and 2.

FIG. 14 is a detailed view showing the control circuit 80 in FIG. 13. In FIG. 14 a J-K flip-flop circuit 82, like the J-K flip-flop circuit 24 in FIG. 2, has its J and K input terminals connected to a power source $V_{C1}$ and its preset terminal PR connected to the output of an OR gate 32. The clock terminal CK of the J-K flip-flop circuit 82 is grounded. The clear terminal CL of the J-K flip-flop circuit 82 is connected to the output of a NAND gate 84, the input terminals of which are connected to a capacitor C5 and the collector of a transistor TR5. The Q output terminal of the flip-flop circuit 82 is connected to NAND gate 86 having an output connected through a resistor R10 to the base of a transistor TR3. The OR gate 32 is connected to the output of a start pulse generator 34 and to the output of a NAND gate 88 having its input terminals connected to the capacitor C7 and the collector or a transistor TR2.

Another J-K flip-flop circuit 90 has its J and K input terminals connected to the power source $B_{C1}$ and its clock terminal CK connected to the output of the OR gate 32. The output terminal Q of the J-K flip-flop circuit 90 is connected to the NAND gate 86 and the output terminal $\overline{Q}$ of the J-K flip-flop circuit 90 is connected to one input terminal of a NAND gate 92. The other input of the NAND gate 92 is connected to the output terminal Q of the flip-flop circuit 82. The output of the NAND gate 92 is connected through a resistor R46 to the base of a transistor TR9. The transistor TR9 has an emitter connected to the power source $V_{C1}$ and a collector grounded through a resistor R47 and connected to the base of a transistor TR10 through a parallel circuit of a capacitor C12 and resistor 48 and a resistor 49. The transistor TR10 has a grounded emitter and a collector connected to a power source $V_{C2}$ through a primary coil L7 of a pulse transformer 94 and a resistor R50. The base of the transistor TR10 is grounded through a resistor R51 and connected through a capacitor C13 to a junction of the resistor 50 and the primary coil L7 in the pulse transformer 94. A secondary coil L8 of the pulse transformer 94 has one end grounded and the other end connected to a resistor R45. A series circuit of resistor R52 and diode D21 is connected in parallel with the secondary coil L8 in the pulse transformer 94.

As will be evident from FIG. 14 a circuit between the NAND gate 86 and the resistor R1 is constructed in substantially the same fashion as a circuit between the NAND gate 92 and the resistor R45.

Figure 15A:
FIGS. 15A to 15J are signal waveform diagrams for explaining the operation of an induction heating circuit in FIGS. 13 and 14.
Figure 15B:
Figure 15C:
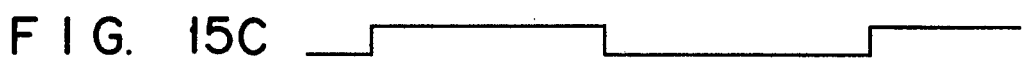
Figure 15D:
Figure 15E:
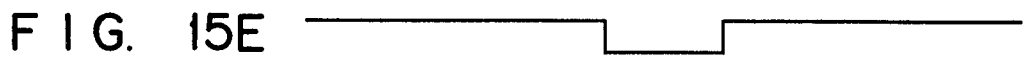
Figure 15F:

At the starting time a low level signal is generated from the output terminal Q of the flip-flop circuit 90. When a start pulse is generated, as shown in FIG. 15A, from the start pulse generator 34 a predetermined time after the operation is started, the flip-flop circuit 82 is set by the start pulse to generate a signal, as shown in FIG. 15B, from its output terminal Q. At the same time, an output signal from the output terminal Q of the flip-flop circuit 90 is inverted as shown in FIG. 15C. This causes a low or zero level signal from the NAND gate 86 to be applied to the base of the transistor TR3 to permit the latter to be rendered conductive. By the conduction of the transistor TR3, the transistor TR4 and then the transistor TR1 are turned ON as explained in connection with the embodiment shown in FIGS. 1 and 2, and a linearly increasing current flows through the heating coil L3 as shown in FIG. 15F. The increasing current is detected at a current detection coil L4 and a voltage corresponding to the detected current is applied as an output voltage of a current detection circuit 20 to the transistor TR2. When the increasing current reaches a predetermined value the transistor TR2 is rendered conductive. In this case, a low level voltage is applied to the base of the transistor TR5, and the transistor TR5 is in the nonconductive state. In consequence, the collector voltage of the transistor is varied from a high level to a low level and a clear pulse signal is applied to the clear terminal CL of the flip-flop circuit 82 through the NAND gate 84 which is opened by the output voltage of a differentiating circuit comprised of the capacitor C5 and resistor R9 and a collector voltage of the transistor TR5. As a result, the flip-flop circuit 82 is cleared and, as shown in FIG. 15B, an output signal from the output terminal Q of the flip-flop circuit 82 is varied to a low level and the transistor TR1 is turned ON.

Figure 15G:
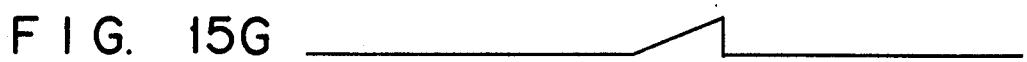
Figure 15H:
Figure 15I:
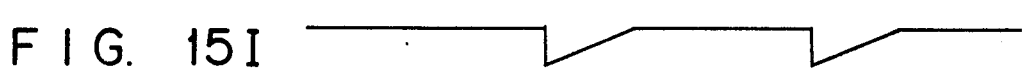

Like the embodiment shown in FIGS. 1 and 2 a resonance current as shown in FIG. 15H flows through the heating coil L3 and a diode current as shown in FIG. 15I flows through the diode D5 from the heating coil L3. During the time period between the time at which the resonance current flows from the capacitor C4 toward the heating coil L3 and reaches a predetermined level and the time at which the above-mentioned diode current reaches the predetermined level, the transistor TR5 is held in the conductive state. At this time, the transistor TR2 is held in the nonconductive state and the collector voltage of the transistor TR2 is held at a high level. When the transistor TR5 is again turned OFF, i.e., the collector voltage of the transistor TR5 is varied from a low level to a high level a pulse signal is generated from the NAND gate 88, causing the flip-flop circuit 82 to be set and inverting the output state of the flip-flop circuit 90. As shown in FIG. 15E a low level signal is generated from the AND gate 92 to cause the transistor TR9 to be rendered conductive. By the conduction of the transistor TR9 a high level signal is applied to the base of the transistor TR10 to cause the latter to be rendered conductive and a high level signal is applied through the pulse transformer 94 to the base of the transistor TR8, causing the transistor TR8 to be turned ON.

Figure 15J:

When the transistor TR8 is turned ON, a linearly increasing current flows through the heating coil L3 as shown in FIG. 15G. When this current reaches the predetermined value as mentioned above, the transistor TR2 is turned ON, causing the flip-flop circuit 82 to be cleared. In consequence a resonance current flows through the heating coil L3 as shown in FIG. 15H and then a diode current as shown in FIG. 15I flows. When the diode current reaches the predetermined value, the output state of the flip-flop circuit 90 is inverted to be returned to the initial state. Such operation is repeated and a current as shown in FIG. 15J flows through the heating coil L3.

Since in this embodiment the conductive states of the transistors TR1 and TR8 are alternately controlled according to the output state of the flip-flop circuit 90, it is possible to set an operation frequency higher than that as involved in the embodiments as explained in FIG. 1 through FIG. 12.

It should be noted that this invention is not restricted to the above-mentioned embodiments. Although, for example, the transistor is used as a switching element it is possible to use a gate turn off thyristor or field effect transistor instead. In the embodiment shown in FIGS. 1 and 2 at least one of the resistors R2 and R4 may be replaced by a variable resistor to obtain the same effect as in the modification in FIG. 4.

What we claim is:

1. An induction heating apparatus comprising first and second DC power source terminals, a series circuit connected between the first and second DC power source terminals and including a series circuit of a heating coil and capacitor, unidirectional means connected in parallel with the capacitor and in a polarity-reversed relation to the first and second DC power source terminals, first switching means connected in parallel with the capacitor, a first current detection means for detecting a current through the heating coil, and a first control circuit for controlling the switching means in response to an output signal of the current detection means by supplying a first output signal to cause the switching means to be rendered nonconductive when the current detection means detects that a first current flowing in a predetermined direction through the heating coil and the switching means in the conductive state reaches a first predetermined value and supplying a second output signal to cause the switching element to be rendered conductive when the current detection means detects that a second current flowing in a direction opposite to said predetermined direction through the heating coil and the unidirectional means reaches a second predetermined value.

2. An induction heating apparatus according to claim 1, wherein said switching means is comprised of a transistor having an emitter-collector path connected in parallel with said capacitor and a base connected to said control circuit.

3. An induction heating apparatus according to claim 1, in which said unidirectional means is a diode.

4. An induction heating apparatus according to claim 1, in which said first control circuit includes a first control signal generating circuit responding to an output signal of said current detecting means to generate a third output signal from a first output terminal when said first current reaches said first predetermined value and generate a fourth output signal from a second output terminal when said current detecting means detects that said second current reaches said second predetermined value, and a second control signal generating circuit for generating said first output signal to cause said switching means to be rendered nonconductive in response to said third output signal from said first control signal generating circuit and for generating said second output signal to cause switching means to be rendered conductive in response to said fourth output signal from said first control signal generating circuit.

5. An induction heating apparatus according to claim 4, in which said first control signal generating circuit comprises a first voltage dividing circuit responding to the output signal of said current detecting means to generate a voltage corresponding to said first current when said switching means is in conductive state, a second voltage dividing circuit connected to said current detection means to generate a voltage corresponding to said second current when said switching means is in nonconductive state, a first pulse generating circuit for generating a pulse when the output voltage of said first voltage dividing circuit reaches a predetermined value, and a second pulse generating circuit for generating a pulse when the output voltage of said second voltage dividing circuit reaches a predetermined value.

6. An induction heating apparatus according to claim 5, in which said first voltage dividing circuit is comprised of a potentiometer.

7. An induction heating apparatus according to claim 5, in which said first voltage dividing circuit is comprised of a pair of series-connected resistors at least one of which is constructed of a variable resistor.

8. An induction heating apparatus according to claim 4, in which said second control signal generating circuit includes a flip-flop circuit for applying a signal of first level to said switching means in response to the third output signal of said first control signal generating circuit to cause the switching means to be rendered nonconductive and applying a signal of second level to said switching means in response to the fourth output signal of said first control signal generating circuit to cause the switching means to be rendered conductive.

9. An induction heating apparatus according to claim 8, further including an AC power source and said DC power source terminals, second current detection means for detecting a current supplied from the AC power source, an AND circuit adapted to receive the fourth output signal of said first control signal generating circuit and having an output connected to said flip-flop circuit, and a second control circuit connected to said second current detecting means to disable said AND circuit when a current detected at said second current detecting means is below a predetermined value.

10. An induction heating apparatus according to claim 8, further including a voltage dividing circuit connected in parallel with said switching means, an AND circuit adapted to receive the fourth output signal of said first control signal generating circuit and supply an output signal to said flip-flop circuit, and a second control circuit connected to said voltage dividing circuit to disable said AND circuit when the output voltage of said voltage dividing circuit exceeds a predetermined value.

11. An induction heating apparatus according to claim 8, further including an AND circuit adapted to receive said fourth output signal of said first control signal generating circuit and having an output connected to said flip-flop circuit, and a rectangular wave generating circuit for cyclically enabling said AND circuit.

12. An induction heating apparatus according to claim 11, in which said rectangular wave generating circuit includes an oscillation circuit comprised of a unijunction transistor and a series circuit of a capacitor and resistor connected in parallel with the unijunction transistor whose emitter is connected to a junction between the resistor and capacitor, a voltage dividing circuit connected in parallel with said series circuit, and a comparing circuit adapted to compare an output signal of said oscillation circuit and an output signal of said voltage dividing circuit to generate a signal of first or second level in accordance with the magnitude of both the output signals.

13. An induction heating apparatus according to claim 1, further including an AC power source, a rectifying circuit connected between said AC power source and said first and second DC power source terminals, a second current detecting means for detecting a current supplied from said AC power source, and a second control circuit connected to said second detecting means to cause said switching means to be rendered nonconductive when a current detected at said second current detecting means is below a predetermined value.

14. An induction heating apparatus according to claim 1, further including a voltage dividing circuit connected in parallel with said switching means, and a second control circuit connected to said voltage dividing circuit to cause said switching means to be rendered nonconductive when the output voltage of the voltage dividing circuit is below a predetermined value.

15. An induction heating apparatus according to claim 1, further including a rectangular wave generating circuit connected to said switching means to further control the conductivity of said switching means.

16. An induction heating apparatus according to claim 15, in which said rectangular wave generating circuit includes an oscillation circuit comprised of a unijunction transistor and a series circuit of a capacitor and resistor connected in parallel with the unijunction transistor whose emitter is connected to a junction between the resistor and capacitor, a voltage dividing circuit connected in parallel with said series circuit, and a comparing circuit adapted to compare an output signal of said oscillation circuit and an output signal of said voltage dividing circuit to generate a signal of first or second level in accordance with the mangitude of both the output signals to further control the conductivity of said switching means.

17. An induction heating apparatus according to claim 1, in which there is further included a second switching means connected in parallel with said first switching means; and said first control circuit comprises a first pulse signal generating circuit responding to the output signal of said current detecting means to generate a first pulse signal when said current detecting means detects that said first current reaches said first predetermined value, a second pulse signal generating circuit responding to the output signal of said current detecting means to generate a second pulse signal when said current detecting means detects that said second current reaches said second predetermined value, a first bistable circuit for generating said first output signal in response to said first pulse signal and said second output signal in response to said second pulse signal, a second bistable circuit having its output state inverted in response to said second pulse signal, a first AND circuit adapted to receive output signals of said first and second bistable circuits and having an output connected to said first switching means, and an AND circuit adapted to receive an inverted version of the output signal of said second bistable circuit and supply, when enabled by said inverted signal, the second output signal from said first bistable circuit to said switching means to cause said switching means to be rendered conductive.

* * * * *